UNITED STATES PATENT OFFICE.

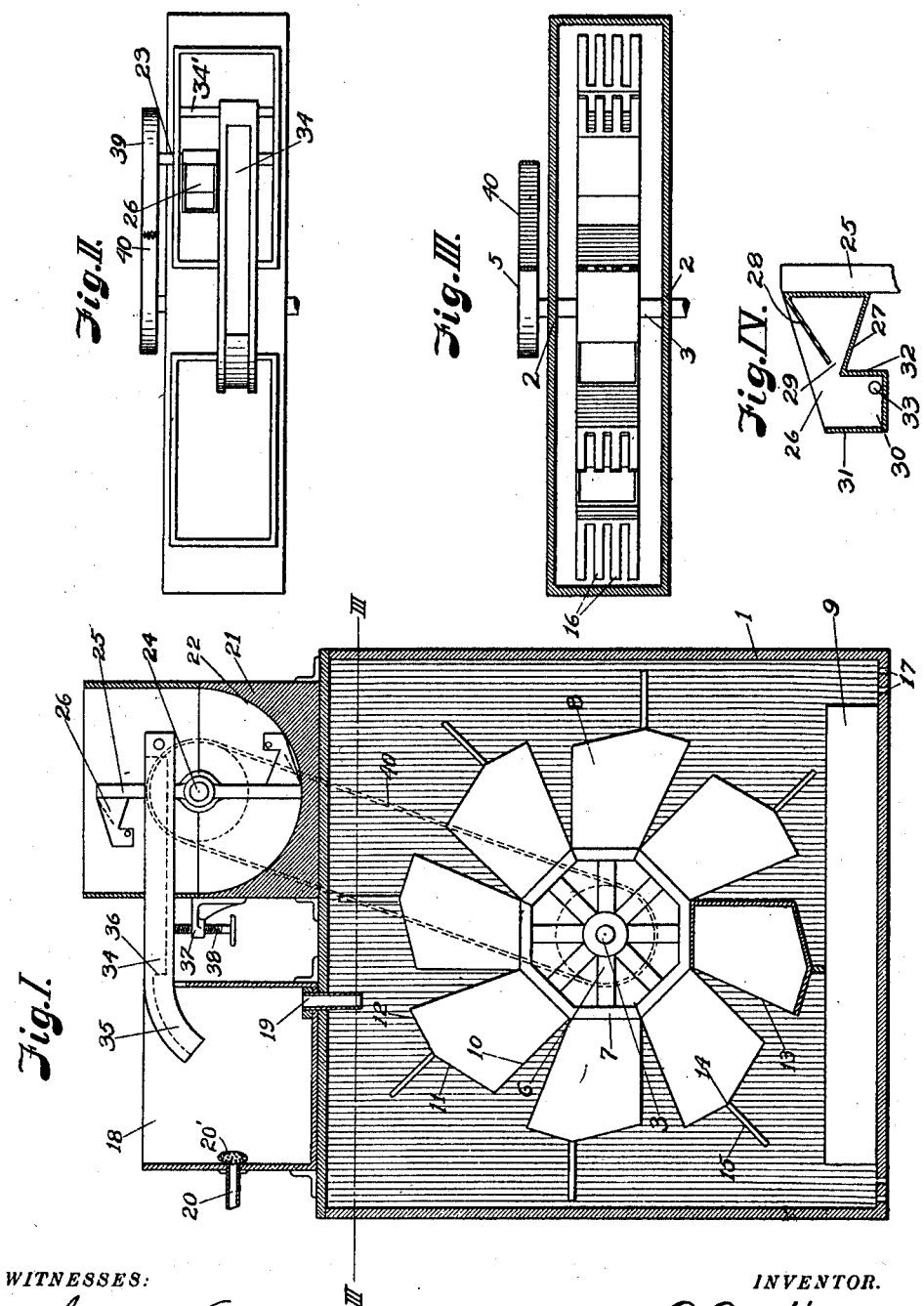

CORTLAND CARLTON, OF IOLA, KANSAS, ASSIGNOR OF ONE-HALF TO C. E. NEWTON, OF IOLA, KANSAS.

LIQUID-MIXING APPARATUS.

1,003,872.     Specification of Letters Patent.     Patented Sept. 19, 1911.

Application filed July 23, 1910. Serial No. 573,518.

*To all whom it may concern:*

Be it known that I, CORTLAND CARLTON, a citizen of the United States, residing at Iola, in the county of Allen and State of Kansas, have invented certain new and useful Improvements in Liquid-Mixing Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to liquid mixing apparatus and has for its particular object to provide an apparatus for mixing water softening compounds.

It is a further object of my invention to provide a liquid mixing apparatus wherein the parts are compactly arranged so as to occupy the smallest possible space, and which is simple and economical in construction and operation.

It is a further object of my invention to provide the improved details of structure which will presently be fully described and are illustrated in the accompanying drawings, in which:—

Figure I is a side elevation of the working parts of an apparatus constructed according to my invention, the casing being sectioned near the facing side to disclose the interior thereof. Fig. II is a plan view of the apparatus. Fig. III is a horizontal section on the line III—III, Fig. I. Fig. IV is a sectional detail of one of the solution dippers.

Referring more in detail to the parts, 1 designates a casing within the sides of which are fixed the shaft bearings 2. Journaled in bearings 2 is a shaft 3, one end of which projects through and beyond the sides of the casing 1 and carries the pulley 5. Fixed to the shaft, within the casing, is a hub member 6 having its rim made up of a number of flat faces 7, upon each of which is mounted a bucket 8, which is preferably composed of sheet metal and is adapted for receiving liquid during its downward travel and for delivering same to a pan 9 in the bottom of the casing.

In order to prevent premature emptying of the buckets 8, I prefer to construct same as illustrated in the drawings, wherein the bottom portion 10 is parallel with a line extending diametrically through the wheel, while a line extended from the front of each bucket would pass through the wheel center. The upper end of each of the buckets has a base portion 11 that extends outwardly from the end of the part 10 and has an inwardly turned lip 12 which is adapted to hold the liquid, after the bucket has passed the horizontal center line of the wheel and until it reaches a desired discharging position over the pan; the mouth 13 being open throughout the length of the bucket.

Fixed to the apex 14, of each of the buckets 8, is a stirrer 15 comprising the fingers 16 which are adapted to extend to the bottom of the pan 9 when the bucket is passing thereover, for the purpose of agitating the mixture and facilitating coagulation.

The pan 9 is shallow as shown in Fig. I and has its sides spaced from the sides of the casing 1, so that liquid may flow over the sides of the pan into a channel between same and the sides of the casing. The bottom of that portion of the casing between its sides and the sides of the pan 9 is provided with apertures 17, through which the liquid may flow to a storage tank or other receptacle.

Located above, and preferably supported by the casing 1, is a mixing tank 18 having communication with the interior of the casing, through a tube 19, through which liquid from the tank is delivered over the buckets 8 at one side of the center of the wheel.

20 designates a supply pipe which enters through one side of the tank 18 and is adapted for delivering raw water thereto through a sprinkler head 20'. Also supported on the casing 1 is a chemical tank 21 having a curved bottom 22 and provided with the shaft bearings 23 at the sides. Extending through and journaled in the bearings 23 is a shaft 24, upon which are fixed the arms 25. Carried on the ends of the arms 25 are dippers 26, which are of peculiar construction to adapt them for filling during the lower part of a revolution, and emptying laterally during the upper part thereof.

Each of the dippers 26 comprises plural members, one of which is substantially triangular in formation, with its base fixed to an arm 25 and its inner face 27 extended beyond and spaced from the outer face 28 to provide a mouth 29 which is pointed into the solution in the bottom of the tank when the arms are revolved, and through which the carrying portion of the bucket is filled.

Extending upwardly from the outer end of the inner face of each of the dippers, is a delivering cup 30 which is preferably square and has its outer member 31 extended beyond the plain of the inner member 32 to retain the liquid within the delivering cup and to prevent the liquid from splashing out of the cup when delivered thereto from the inner bucket portion.

In one side of the delivery cup 30, near the bottom thereof, is an aperture 33, through which liquid may be discharged laterally from the cup, as will presently be described.

34 designates a trough which is pivotally connected with the interior of tank 21, at one side of the arms 25, by means of a pin 34′ that extends laterally from the head of the trough and is revolubly mounted in the sides of the solution chamber, the free end of the trough being extended through the sides of the tanks 21 and 18, within which latter it is provided with a downturned discharge nozzle 35.

The trough 34 is provided, near its outer end, with a shoulder 36 which is adapted to stop the flow of liquid between the tanks until the liquid has filled the lower portion of the trough to the depth of the shoulder, so that it may flow thereover.

Fixed to the tank 21 is a bracket 37, within which is threaded a set screw 38, upon which the outer end of the trough 34 rests, so that the free end of the trough may be raised or lowered by manipulation of the set screw.

It is apparent that when the discharge end of the trough is in a lowered position, water delivered into the trough will flow freely into the mixing tank, while when the discharge end is raised the water will be retarded or will overflow back into the solution chamber.
Fixed to one end of the shaft 24 is a pulley 39, over which and over the pulley 5 a driving belt 40 is adapted to travel, so that the arms 25 are revolved upon the revolution of the wheel shaft 3.
In using the apparatus, a chemical solution is placed in the bucket 21 and raw water delivered to the tank 18 through the supply pipe 20. The apparatus is then started in motion, so that the dippers 26 pass downwardly through the liquid solution in tank 21 and take up a charge in the carrying cups.

As the dippers 26 travel through the upper part of their revolution, the solution flows over the end of the face 27 into the delivery cup 30 and escapes through the aperture 33 in a jet and falls into trough 34, through which it flows into the mixing tank 18, where it is mixed with raw water which enters the tank 18 in a spray from the sprinkler head 20′, the spray serving to mix the raw water and solution more thoroughly than would be done by an even flow. The liquid mixture then flows through the pipe 19 into the buckets 10 and carries same around until they are in position over the central portion of pan 9, when the liquid is discharged over the lips 12 into the pan. During the revolution of the wheel, the stirrers 15, which project from the buckets, are passed through the liquid in pan 9, stirring same to assist coagulation and precipitation. When the pan has been filled, the liquid flows over the edge of same in a film and is delivered to the channel between the pan sides and the sides of the tank, from which it escapes through the apertures 17.

It is apparent that with an apparatus of this description, the chemical solution may be delivered to the mixing tank in measured quantities and in proportion to the intake of raw water, and that the liquid may be thoroughly mixed before its delivery to the storage tank by its flow between the mixing tank and wheel casing and by its travel through the buckets and pan.

Having thus described my invention, what I claim as new therein and desire to secure by Letters-Patent is:—

1. In a liquid mixing apparatus, the combination with a mixing tank of a casing having communication with said tank, a pan carried on the bottom of said casing, a wheel revolubly mounted in said casing and having buckets on its periphery adapted for receiving liquid from said tank and discharging same into said pan, and stirrers carried by said buckets and adapted for projection into said pan when said wheel is revolved.

2. In a liquid mixing apparatus, the combination of a solution tank and mixing tank, means for delivering liquid in measured quantities from the solution tank to the mixing tank, a casing, a wheel in said casing having buckets on its periphery adapted for receiving liquid from the mixing tank, a pan in the bottom of said casing adapted for receiving liquid from said buckets, and stirrers carried by and projecting from said buckets, substantially as and for the purpose set forth.

3. In a liquid mixing apparatus, a casing having an apertured bottom, a pan seated on the bottom of said casing and set in from the sides thereof, a wheel revolubly mounted within said casing and having buckets adapted for travel over said pan, a mixing tank having a tube for conducting liquid therefrom and discharging same over said buckets, a solution tank having communication with the mixing tank, and dippers revolubly mounted within the solution tank.

4. In a liquid mixing apparatus, a wheel casing having a pan located therein, a wheel revolubly mounted within the casing, buckets fixed to the periphery of said wheel, the front of each of said buckets being open and the ends thereof being lipped to retard discharge of liquid therefrom, during the revolution of the wheel, and means for delivering liquid to said buckets, for the purpose set forth.

5. In a liquid mixing apparatus the combination with a wheel casing, of a pan located in the bottom of said casing and set in from the sides thereof, the part of said bottom between the pan and the casing sides being apertured, a wheel revolubly mounted within the casing, a plurality of buckets fixed to the periphery of said wheel, each having an opening at one of its radial sides, a mixing tank having communication with the interior of the casing, and a solution tank having communication with said mixing tank.

6. In a liquid mixing apparatus, the combination of a solution tank, a mixing tank, a trough pivotally mounted within the solution tank, and adapted for discharge into the mixing tank, means for adjusting said trough, and dippers revolubly mounted within the solution tank and adapted to discharge into said trough.

7. In a liquid mixing apparatus, the combination of a solution tank, a mixing tank, a trough pivotally mounted in said solution tank and extending into said mixing tank, said trough having a nozzle at its discharge end, opening above the bottom of the main trough chamber, means for adjusting said trough, and dippers revolubly mounted within the solution tank and adapted for discharge into said trough.

8. In a liquid mixing apparatus, the combination of a solution tank, a mixing tank, a trough pivotally connected with said solution tank and having a nozzle directed into said mixing tank, a bracket, a set screw carried by the bracket and supporting the free end of the trough, and dippers revolubly mounted in said solution tank and adapted for discharge into said trough.

In testimony whereof I affix my signature in presence of two witnesses.

CORTLAND CARLTON.

Witnesses:
MYRTLE M. JACKSON,
ARTHUR C. BROWN.

---

Copies of this patent may be obtained for five cents each, by addressing the "Commissioner of Patents, Washington, D. C."